US009188827B2

(12) United States Patent
Sato et al.

(10) Patent No.: US 9,188,827 B2
(45) Date of Patent: Nov. 17, 2015

(54) DISPLAY DEVICE (71) Applicant: Japan Display Inc., Tokyo (JP)

(72) Inventors: Toshihiro Sato, Tokyo (JP); Yukio Matsumoto, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/109,985

(22) Filed: Dec. 18, 2013

(65) Prior Publication Data

US 2014/0168745 A1 Jun. 19, 2014

(30) Foreign Application Priority Data

Dec. 18, 2012 (JP) ................................. 2012-275592

(51) Int. Cl.
*G02F 1/155* (2006.01)
*G02F 1/163* (2006.01)
*G02F 1/1335* (2006.01)
*G02F 1/153* (2006.01)

(52) U.S. Cl.
CPC .......... *G02F 1/163* (2013.01); *G02F 1/133514* (2013.01); *G02F 1/153* (2013.01); *G02F 2203/34* (2013.01)

(58) Field of Classification Search
CPC .... G02F 1/155; G02F 1/163; G02F 1/133514
USPC .................... 359/265–275; 345/80, 105, 204, 345/212–214, 531
See application file for complete search history.

(56) References Cited

U.S. PATENT DOCUMENTS 7,116,309 B1 10/2006 Kimura et al.
2012/0306940 A1* 12/2012 Machida et al. ............. 345/690

FOREIGN PATENT DOCUMENTS

| JP | 2000-292818 A | 10/2000 |
| JP | 2005-85683 | 3/2005 |
| JP | 2011-35087 | 2/2011 |
| JP | 2011-039381 A | 2/2011 |
| JP | 2012-155017 A | 8/2012 |
| KR | 2000-0027508 A | 5/2000 |

OTHER PUBLICATIONS

Office Action dated on Jan. 30, 2015 regarding a counterpart Korean Patent Application No. 10-2013-0156060.
Notice of Allowance dated on Apr. 30, 2015 regarding a counterpart Korean patent application No. 10-2013-0156060.

* cited by examiner

*Primary Examiner* — Tuyen Tra
(74) *Attorney, Agent, or Firm* — Lowe Hauptman & Ham, LLP (57) ABSTRACT A display device includes a display panel for displaying a white image; an electrochromic layer stacked on the display panel; a voltage application unit for applying a driving voltage to the electrochromic layer; and a display unit for displaying the white image on the display panel. The electrochromic layer allows a spectrum of light to be transmitted therethrough to be controlled in accordance with the driving voltage applied thereto; and the voltage application unit controls the driving voltage to be applied to the electrochromic layer in synchronization with display of the image on the display panel by the display unit, thus to control the spectrum of the light to be transmitted through the electrochromic layer.

17 Claims, 6 Drawing Sheets

DISPLAY DEVICE

CROSS-REFERENCE TO RELATED APPLICATIONS

This application is based upon and claims the benefit of priority from the prior Japanese Patent Application No. 2012-275592, filed on 18 Dec. 2012, the entire contents of which are incorporated herein by reference.

FIELD

The present invention relates to a display device, and specifically to a display device which includes an organic EL display panel for displaying a white image and an electrochromic layer stacked thereon and thus is capable of providing high-definition color display easily.

BACKGROUND

Organic EL display devices including an organic light emitting diode (OLED) which uses organic electroluminescence (EL) are splendid in power consumption, lightweightedness, thinness, moving picture characteristic and viewing angle characteristic. Recently, organic EL display devices have been actively developed and put into practice.

As organic EL display panels for providing color display, the following two types of organic EL display panels are known (see, for example, Patent Document 1: Japanese Laid-Open Patent Publication No. 2005-85683; and Patent Document 2: Japanese Laid-Open Patent Publication No. 2011-35087).

(1) A three color type organic EL display panel in which red (R), green (G) and blue (B) light emitting elements are used as organic light emitting diodes (OLEDs) to provide color display.

(2) A color filter type organic EL display panel in which an organic light emitting diode (OLED) for emitting white light is used and the white light is transmitted through red (R), green (G) and blue (B) color filters to provide color display.

The above-described three color type organic EL display panel has the following problems. One problem is that at least three sub pixels are required for one pixel, which makes it difficult to provide high-definition display. Another problem is that a structure including RGB light emitting elements for providing high-definition display requires costly production facilities in order to obtain sufficient large process margins.

The above-described color filter type organic EL display panel also has a problem that there is a limit to the definition improvement and it is difficult to reduce the cost.

The present invention for solving the above-described problems of the conventional art has an object of providing a display device capable of displaying a high-definition color image easily without using color filters or red (R), green (G) or blue (B) sub pixels.

The above-described and other objects and novel features of the present invention will be made apparent by the description in this specification and the attached drawings.

SUMMARY

A brief overview of an illustrative embodiment of the invention disclosed in this application is as follows.

According to the present invention, an electrochromic layer acting as a filter is stacked on a display panel for displaying a white image. In synchronization with display of the white image (image of only a luminance) for, for example, red (R), green (G) or blue (B) on the display panel, a driving voltage to be applied to the electrochromic layer is controlled such that light transmitted through the electrochromic layer is red (R), green (G) or blue (B). In this manner, a color image is displayed in a field sequential system.

Owing to this, according to the present invention, high-definition color display is realized easily without using color filters or red (R), green (G) or blue (B) sub pixels.

Patent Document 1 described above discloses that a photochromic material is used to guarantee a certain level of clearness for the image displayed on a bottom emission type organic EL display panel even under strong external light.

Patent Document 2 described above discloses that an electrochromic material is used for an ND filter (light reduction filter) for reducing the luminance of the image displayed on the organic EL display panel.

However, neither Patent Document 1 nor Patent Document 2 discloses stacking an electrochromic layer on the display panel for displaying a white image so that the electrochromic layer acts as a filter.

An effect of an illustrative embodiment of the invention disclosed in this application can be described as follows briefly.

The present invention provides a display device capable of displaying a high-definition color image easily without using color filters or red (R), green (G) or blue (B) sub pixels.

DESCRIPTION OF EMBODIMENTS

Hereinafter, examples of the present invention will be described in detail with reference to the drawings.

In all the figures provided to illustrate the examples, elements having the same functions have the same reference signs, and the descriptions thereof will not be repeated. The following examples are not intended to limit the interpretation of the scope of the claims of the present invention.

Figure 1:
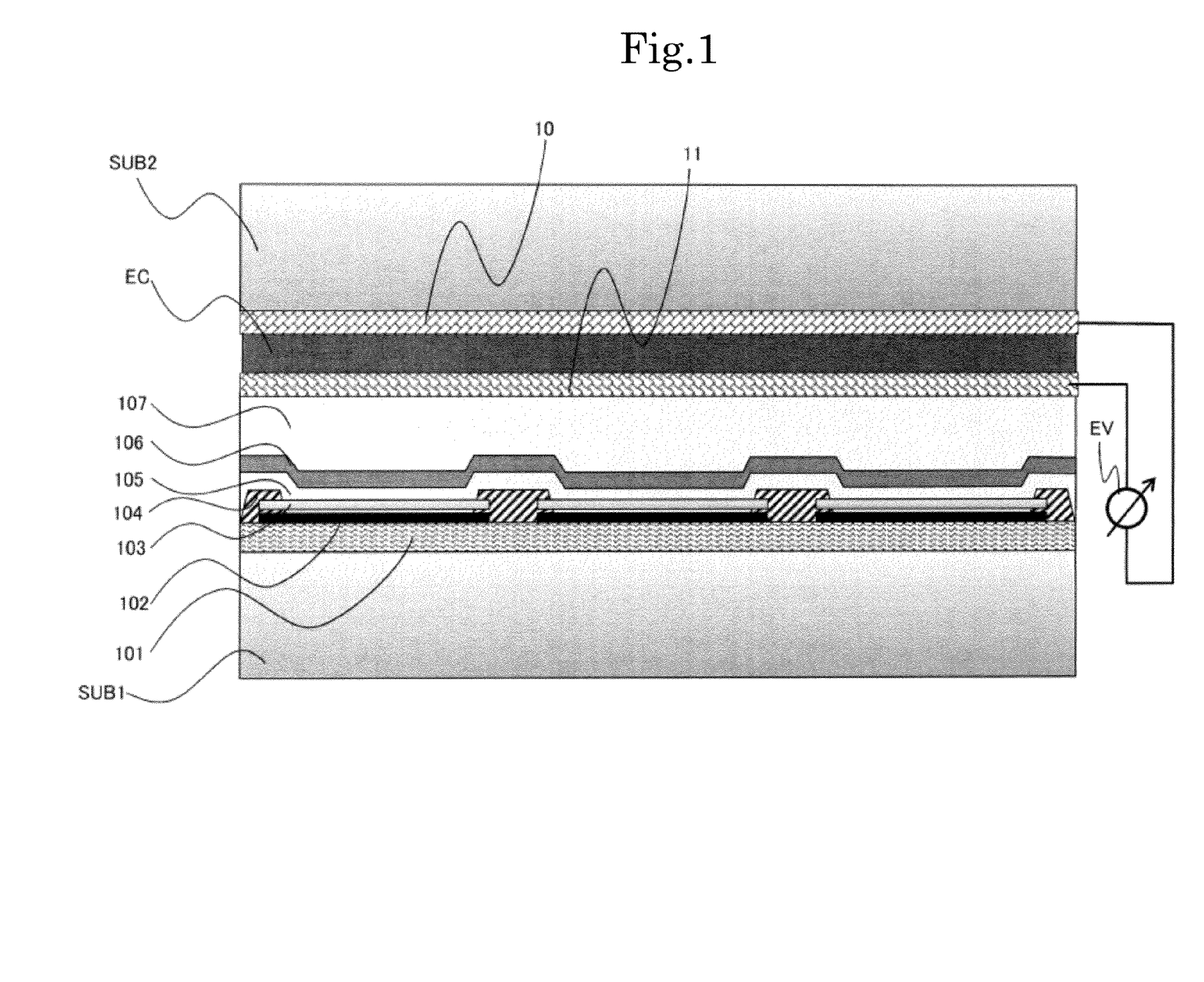
FIG. 1 is a cross-sectional view showing a structure of a display device in Example 1 of the present invention.

FIG. 1 is a cross-sectional view showing a structure of a display device in Example 1 of the present invention.

In this example, a top emission type organic EL display panel (PNL; see FIG. 2) is formed on the side of a first substrate (SUB1). As shown in FIG. 1, the top emission type organic EL display panel (PNL) includes the first substrate (SUB1), a TFT circuit formation section 101, a reflective layer 102, an OLED lower electrode 103, an insulating layer 104, a white light emitting layer 105, an OLED upper transparent electrode 106, and a sealing/filling layer 107.

On the side of a second substrate (SUB2), an electrochromic layer (EC) acting as a filter is formed.

The electrochromic layer (EC) is held between an EC upper transparent electrode 10 and an EC lower transparent electrode 11. A voltage (EV in FIG. 1) to be supplied to the EC upper transparent electrode 10 and the EC lower transparent electrode 11 is controlled to control the driving voltage to be applied to the electrochromic layer (EC), and thus the spectrum of light transmitted through the electrochromic layer (EC) is changed. The EC upper transparent electrode 10 and the EC lower transparent electrode 11 hold an insulating layer therebetween when necessary.

The electrochromic layer (EC) is formed of, for example, a conjugated polymer selected from the group consisting of polyparaphenylene, polythiophene, polyphenylenevinylene, polypyrrole, polyaniline, arylamine-substituted polyarylenevinylene, and polyfluorene polymer.

Figure 2:
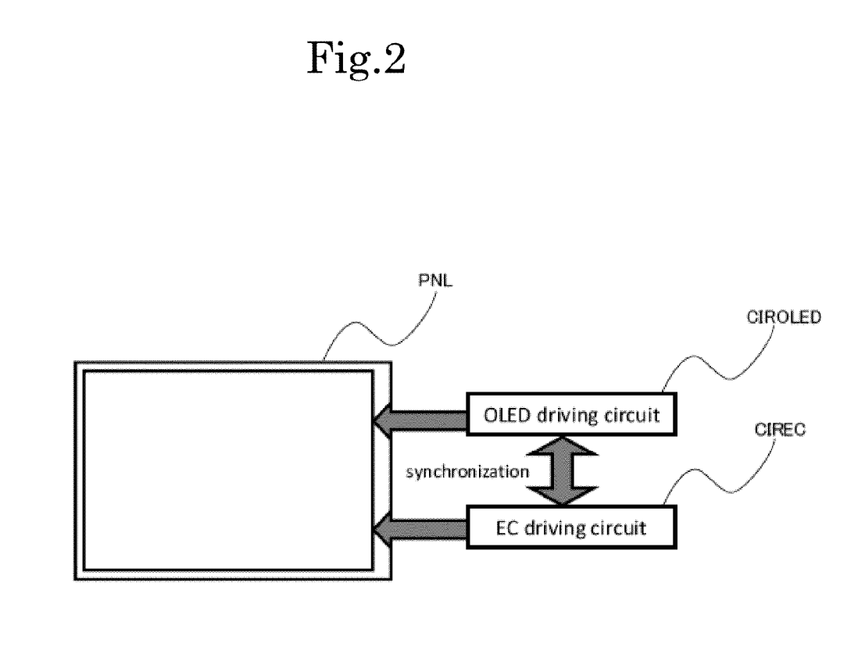
FIG. 2 shows a method for driving the display device in Example 1 of the present invention.

FIG. 2 shows a method for driving the display device in Example 1 of the present invention.

Referring to FIG. 2, in this example, the display device is operated as follows. A white image (luminance image) is displayed on the organic EL display panel (PNL) by an OLED driving circuit (CIROLED). A driving voltage to be applied to the electrochromic layer (EC) is controlled by an EC driving circuit (CIREC) in synchronization with the display by the OLED driving circuit (CIROLED), and thus the spectrum of the light transmitted through the electrochromic layer (EC) is changed. In this manner, a color image is displayed by the field sequential system.

For example, one frame is divided into first through third periods. In the first period, a white image (luminance image) for red (R) is displayed on the organic EL display panel (PNL) by the OLED driving circuit (CIROLED). Also in the first period, a driving voltage to be applied to the electrochromic layer (EC) is controlled by the EC driving circuit (CIREC) such that the light transmitted through the electrochromic layer (EC) is red (R).

In the second period, a white image (luminance image) for green (G) is displayed on the organic EL display panel (PNL) by the OLED driving circuit (CIROLED). Also in the second period, a driving voltage to be applied to the electrochromic layer (EC) is controlled by the EC driving circuit (CIREC) such that the light transmitted through the electrochromic layer (EC) is green (G).

In the third period, a white image (luminance image) for blue (B) is displayed on the organic EL display panel (PNL) by the OLED driving circuit (CIROLED). Also in the third period, a driving voltage to be applied to the electrochromic layer (EC) is controlled by the EC driving circuit (CIREC) such that the light transmitted through the electrochromic layer (EC) is blue (B). In this manner, a color image is displayed by the field sequential system.

Light transmitted through the electrochromic layer (EC) is of a plurality of colors among red (R), green (G), blue (B), yellow (Y), cyan (Cy), magenta (Mg) and white (W). Color display is provided by light of a mixture of such a plurality of colors.

According to this example, images of red (R), green (G) and blue (B) are displayed by one sub pixel. Therefore, as compared with the conventional three color type organic EL display panel including red (R), green (G) and blue (B) sub pixels, the same size of pixels can be used to display at least three times the number of images. This can improve the definition easily. In addition, according to this example, color filters are not used. Therefore, high-definition color display can be provided easily. Since color mixing is not performed, viewing angle dependence is reduced.

Figure 3:
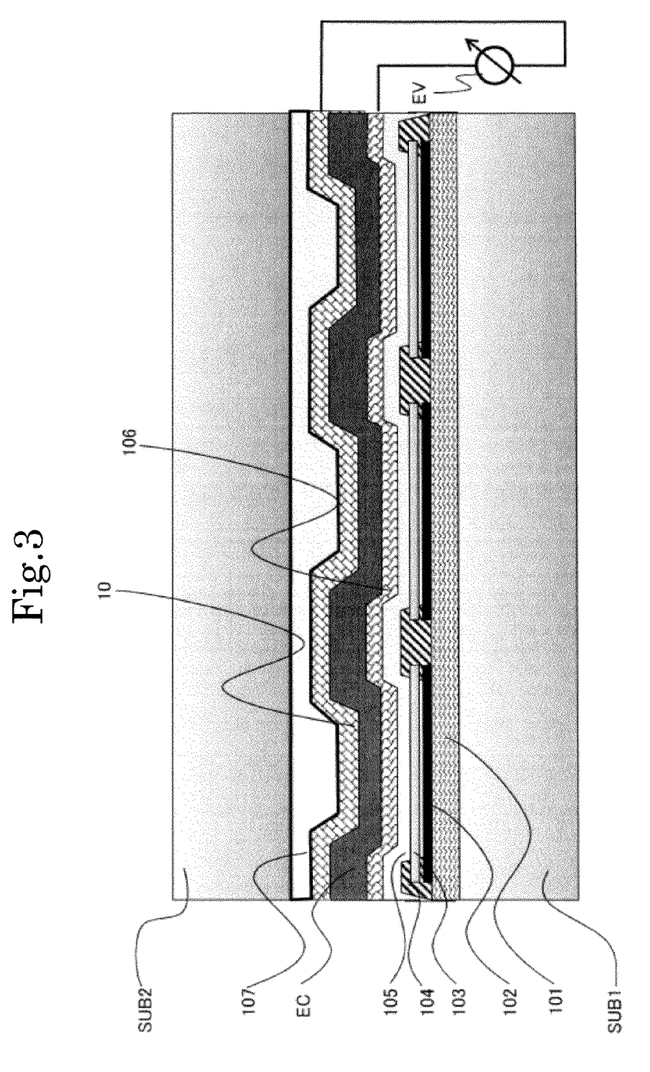
FIG. 3 is a cross-sectional view showing a structure of a display device in Example 2 of the present invention.

FIG. 3 is a cross-sectional view showing a structure of one pixel of a display device in Example 2 of the present invention.

In this example, unlike in Example 1 described above, the EC upper transparent electrode 10 and the electrochromic layer (EC) are provided on the OLED upper transparent electrode 106, the sealing/filling layer 107 is provided on the EC upper transparent electrode 10, and the OLED upper transparent electrode 106 also acts as the EC lower transparent electrode 11. Except for these points, the display device in Example 2 is the same as the display device in Example 1 in terms of the structure and the manner of operation. The same descriptions will not be repeated.

In this example, the OLED upper transparent electrode 106 and the EC lower transparent electrode 11 can be realized by one electrode. Therefore, the display device in this example has a simpler structure and is produced more easily than the display device in Example 1.

As compared with the display device in Example 1, the number of layers is smaller by one since the OLED upper transparent electrode 106 is also used as the EC lower transparent electrode 11. Therefore, reduction in the light emitted by the white light emitting layer 105 of the OLED can be decreased.

Figure 4:
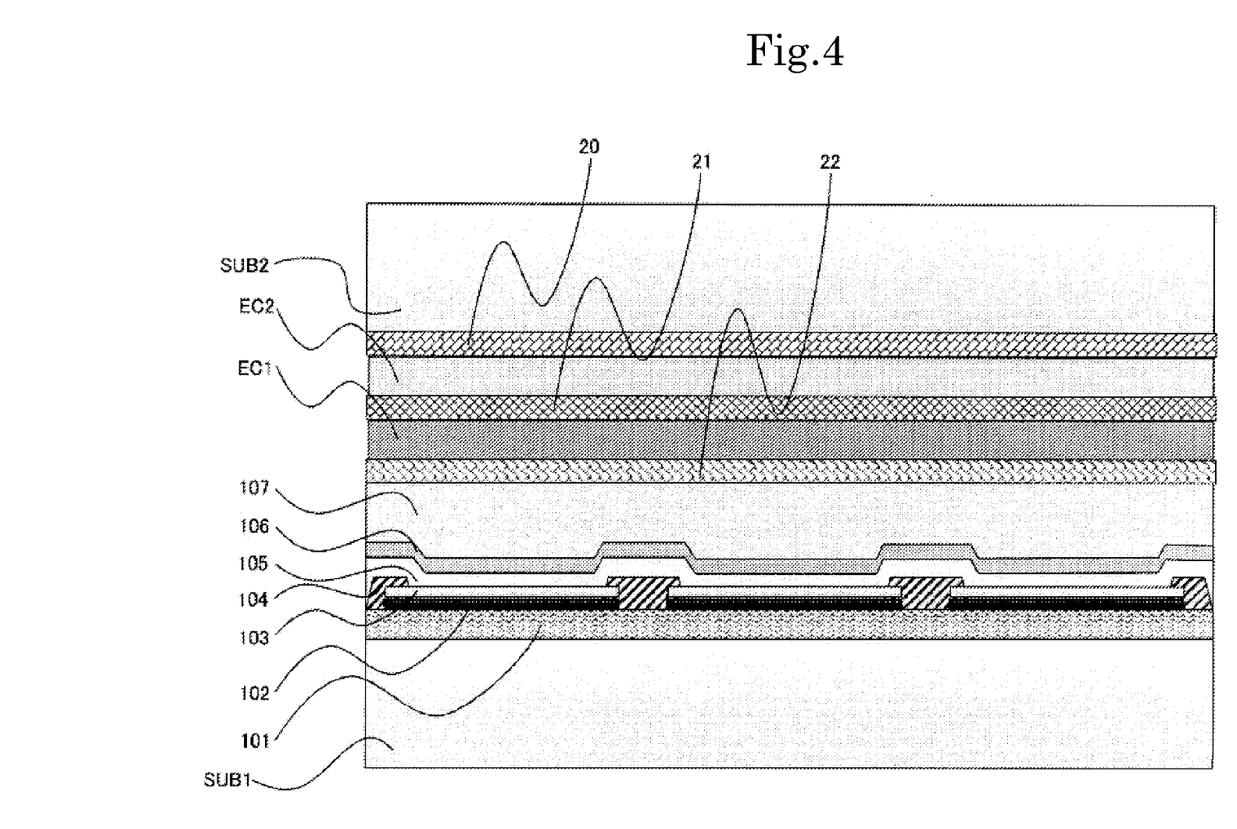
FIG. 4 is a cross-sectional view showing a structure of a display device in Example 3 of the present invention.

FIG. 4 is a cross-sectional view showing a structure of one pixel of a display device in Example 3 of the present invention.

In this example, unlike in Example 1 described above, two electrochromic layers, namely, a first electrochromic layer (EC1) and a second electrochromic layer (EC2), are stacked on the sealing/filling layer 107.

The first electrochromic layer (EC1) is held between an EC intermediate transparent electrode 21 and an EC lower transparent electrode 22, and the second electrochromic layer (EC2) is held between an EC upper transparent electrode 20 and the EC intermediate transparent electrode 21.

Voltages to be supplied to the EC upper transparent electrode 20, the EC intermediate transparent electrode 21 and the EC lower transparent electrode 22 are controlled to control driving voltages to be applied to the first electrochromic layer (EC1) and the second electrochromic layer (EC2). Thus, the spectrum of light transmitted through the first electrochromic layer (EC1) and the second electrochromic layer (EC2) is changed. The EC upper transparent electrode 20 and the EC intermediate transparent electrode 21, and the EC intermediate transparent electrode 21 and the EC lower transparent electrode 22, hold an insulating layer therebetween when necessary.

The first electrochromic layer (EC1) and the second electrochromic layer (EC2) are each formed of, for example, a conjugated polymer selected from the group consisting of polyparaphenylene, polythiophene, polyphenylenevinylene, polypyrrole, polyaniline, arylamine-substituted polyarylenevinylene, and polyfluorene polymer.

In this example, the display device is operated as follows. A white image (luminance image) is displayed on the organic EL display panel (PNL) by the OLED driving circuit (CIROLED). Driving voltages to be applied to the first electrochromic layer (EC1) and the second electrochromic layer (EC2) are controlled by the EC driving circuit (CIREC) in synchronization with the display by the OLED driving circuit (CIROLED), and thus the spectrum of the light transmitted through the first electrochromic layer (EC1) and the second electrochromic layer (EC2) is changed. In this manner, a color image is displayed by the field sequential system.

For example, one frame is divided into first through third periods. In the first period, a white image (luminance image) for red (R) is displayed on the organic EL display panel (PNL) by the OLED driving circuit (CIROLED). Also in the first period, driving voltages to be applied to the first electrochromic layer (EC1) and the second electrochromic layer (EC2) are controlled by the EC driving circuit (CIREC) such that the light transmitted through the first electrochromic layer (EC1) and the second electrochromic layer (EC2) is red (R).

In the second period, a white image (luminance image) for green (G) is displayed on the organic EL display panel (PNL) by the OLED driving circuit (CIROLED). Also in the second period, driving voltages to be applied to the first electrochromic layer (EC1) and the second electrochromic layer (EC2) are controlled by the EC driving circuit (CIREC) such that the light transmitted through the first electrochromic layer (EC1) and the second electrochromic layer (EC2) is green (G).

In the third period, a white image (luminance image) for blue (B) is displayed on the organic EL display panel (PNL) by the OLED driving circuit (CIROLED). Also in the third period, driving voltages to be applied to the first electrochromic layer (EC1) and the second electrochromic layer (EC2) are controlled by the EC driving circuit (CIREC) such that the light transmitted through the first electrochromic layer (EC1) and the second electrochromic layer (EC2) is blue (B). In this manner, a color image is displayed by the field sequential system.

Light transmitted through the first electrochromic layer (EC1) and the second electrochromic layer (EC2) is of a plurality of colors among red (R), green (G), blue (B), yellow (Y), cyan (Cy), magenta (Mg) and white (W). Color display is provided by light of a mixture of such a plurality of colors.

The color of the light to be transmitted through the two electrochromic layers, namely, the first electrochromic layer (EC1) and the second electrochromic layer (EC2), may be controlled by use of either one of the first electrochromic layer (EC1) and the second electrochromic layer (EC2), or may be controlled by use of both of the first electrochromic layer (EC1) and the second electrochromic layer (EC2) in combination.

For example, in the case where the light transmitted through the two electrochromic layers is to be red (R), the control may be performed such that the light transmitted through the first electrochromic layer (EC1) is red while the light transmitted through the second electrochromic layer (EC2) is transparent. Alternatively, the control may be performed such that a mixture of the light transmitted through the first electrochromic layer (EC1) and the light transmitted through the second electrochromic layer (EC2) is red (R).

In this example also, images of red (R), green (G) and blue (B) are displayed by one sub pixel. Therefore, as compared with the conventional three color type organic EL display panel including red (R), green (G) and blue (B) sub pixels, the same size of pixels can be used to display at least three times the number of images. This can improve the definition easily.

In addition, according to this example, color filters are not used. Therefore, high-definition color display can be provided easily. Since color mixing is not performed, viewing angle dependence is reduced.

In this example, the degree of freedom of the color of light transmitted through the electrochromic layers is higher than in Examples 1 and 2 described above. Two colors are mixed to display an image of colors in a wider range.

In this example also, as in Example 2, the EC upper transparent electrode 20, the second electrochromic layer (EC2), the EC intermediate transparent electrode 21 and the first electrochromic layer (EC1) may be provided on the OLED upper transparent electrode 106, the sealing/filling layer 107 may be provided on the EC upper transparent electrode 20, and the OLED upper transparent electrode 106 may also act as the EC lower transparent electrode 22.

Figure 5:
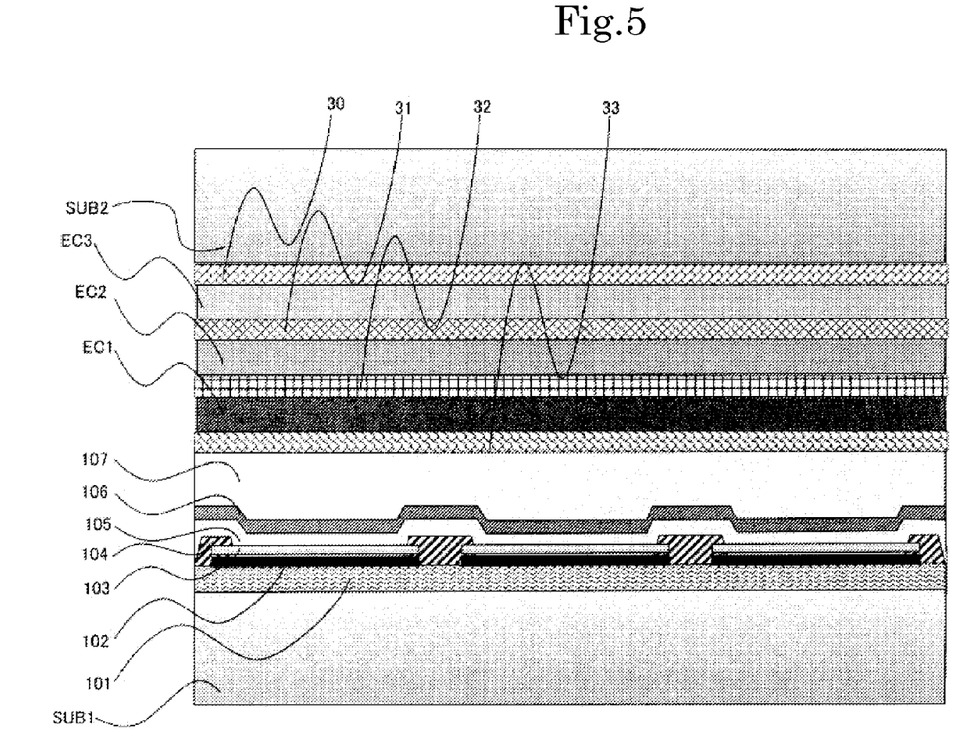
FIG. 5 is a cross-sectional view showing a structure of a display device in Example 4 of the present invention.

FIG. 5 is a cross-sectional view showing a structure of one pixel of a display device in Example 4 of the present invention.

In this example, unlike in Example 1 described above, three electrochromic layers, namely, a first electrochromic layer (EC1), a second electrochromic layer (EC2) and a third electrochromic layer (EC3), are stacked on the sealing/filling layer 107.

The first electrochromic layer (EC1) is held between an EC intermediate transparent electrode 1 (32) and an EC lower transparent electrode 33. The second electrochromic layer (EC2) is held between an EC intermediate transparent electrode 2 (31) and the EC intermediate transparent electrode 1 (32). The third electrochromic layer (EC3) is held between an EC upper transparent electrode 30 and the EC intermediate transparent electrode 2 (31).

Voltages to be supplied to the EC upper transparent electrode 30, the EC intermediate transparent electrode 2 (31), the EC intermediate transparent electrode 1 (32) and the EC lower transparent electrode 33 are controlled to control driving voltages to be applied to the first electrochromic layer (EC1) through the third electrochromic layer (EC3). Thus, the spectrum of light transmitted through the first electrochromic layer (EC1) through the third electrochromic layer (EC3) is changed. The EC upper transparent electrode 30 and the EC intermediate transparent electrode 2 (31), the EC intermediate transparent electrode 2 (31) and the EC intermediate transparent electrode 1 (32), the EC intermediate transparent electrode 1 (32) and the EC lower transparent electrode 33, hold an insulating layer therebetween when necessary.

The first electrochromic layer (EC1), the second electrochromic layer (EC2) and the third electrochromic layer (EC3) are each formed of, for example, a conjugated polymer selected from the group consisting of polyparaphenylene, polythiophene, polyphenylenevinylene, polypyrrole, polyaniline, arylamine-substituted polyarylenevinylene, and polyfluorene polymer.

In this example, the display device is operated as follows. A white image (luminance image) is displayed on the organic EL display panel (PNL) by the OLED driving circuit (CIROLED). Driving voltages to be applied to the first electrochromic layer (EC1) through the third electrochromic layer (EC3) are controlled by the EC driving circuit (CIREC) in synchronization with the display by the OLED driving circuit (CIROLED), and thus the spectrum of the light transmitted through the first electrochromic layer (EC1) through the third electrochromic layer (EC3) is changed. In this manner, a color image is displayed by the field sequential system.

For example, one frame is divided into first through third periods. In the first period, a white image (luminance image) for red (R) is displayed on the organic EL display panel (PNL) by the OLED driving circuit (CIROLED). Also in the first period, driving voltages to be applied to the first electrochromic layer (EC1) through the third electrochromic layer (EC3) are controlled by the EC driving circuit (CIREC) such that the light transmitted through the first electrochromic layer (EC1) through the third electrochromic layer (EC3) is red (R).

In the second period, a white image (luminance image) for green (G) is displayed on the organic EL display panel (PNL) by the OLED driving circuit (CIROLED). Also in the second period, driving voltages to be applied to the first electrochromic layer (EC1) through the third electrochromic layer (EC3) are controlled by the EC driving circuit (CIREC) such that the light transmitted through the first electrochromic layer (EC1) through the third electrochromic layer (EC3) is green (G).

In the third period, a white image (luminance image) for blue (B) is displayed on the organic EL display panel (PNL)

by the OLED driving circuit (CIROLED). Also in the third period, driving voltages to be applied to the first electrochromic layer (EC1) through the third electrochromic layer (EC3) are controlled by the EC driving circuit (CIREC) such that the light transmitted through the first electrochromic layer (EC1) through the third electrochromic layer (EC3) is blue (B). In this manner, a color image is displayed by the field sequential system.

Light transmitted through the first electrochromic layer (EC1), the second electrochromic layer (EC2) and the third electrochromic layer (EC3) is of a plurality of colors among red (R), green (G), blue (B), yellow (Y), cyan (Cy), magenta (Mg) and white (W). Color display is provided by light of a mixture of such a plurality of colors.

The color of the light to be transmitted through the third electrochromic layers, namely, the first electrochromic layer (EC1), the second electrochromic layer (EC2) and the third electrochromic layer (EC3), may be controlled by use of either one of the first electrochromic layer (EC1), the second electrochromic layer (EC2) and the third electrochromic layer (EC3), or may be controlled by use of all of the first electrochromic layer (EC1), the second electrochromic layer (EC2) and the third electrochromic layer (EC3) in combination.

For example, in the case where the light transmitted through the three electrochromic layers is to be red (R), the control may be performed such that the light transmitted through the first electrochromic layer (EC1) is red while the light transmitted through the second electrochromic layer (EC2) and the light transmitted through the third electrochromic layer (EC3) are transparent. Alternatively, the control may be performed such that a mixture of the light transmitted through the first electrochromic layer (EC1) and the light transmitted through the second electrochromic layer (EC2), a mixture of the light transmitted through the second electrochromic layer (EC2) and the light transmitted through the third electrochromic layer (EC3), or a mixture of the light transmitted through the first electrochromic layer (EC1) and the light transmitted through the third electrochromic layer (EC3) is red (R).

In this example also, images of red (R), green (G) and blue (B) are displayed by one sub pixel. Therefore, as compared with the conventional three color type organic EL display panel including red (R), green (G) and blue (B) sub pixels, the same size of pixels can be used to display at least three times the number of images. This can improve the definition easily.

In addition, according to this example, color filters are not used. Therefore, high-definition color display can be provided easily. Since color mixing is not performed, viewing angle dependence is reduced.

In this example, the degree of freedom of the color of light transmitted through the electrochromic layers is higher than in Examples 1, 2 and 3 described above. Two or three colors are mixed to display an image of colors in a wider range.

In this example also, as in Example 2, the EC upper transparent electrode 30, the third electrochromic layer (EC3), the EC intermediate transparent electrode 2 (31), the second electrochromic layer (EC2), the EC intermediate transparent electrode 1 (32) and the first electrochromic layer (EC1) may be provided on the OLED upper transparent electrode 106, the sealing/filling layer 107 may be provided on the EC upper transparent electrode 30, and the OLED upper transparent electrode 106 may also act as the EC lower transparent electrode 33.

Figure 6:
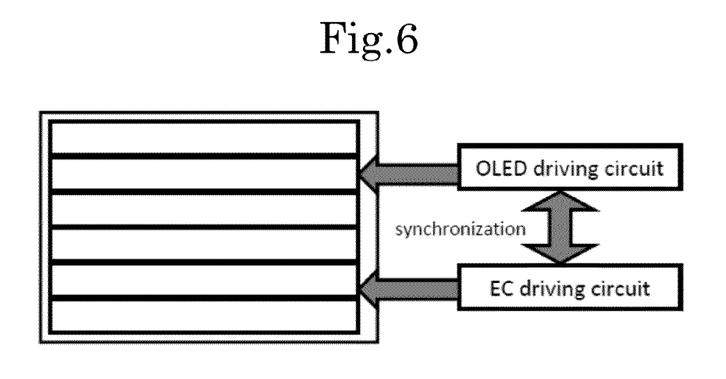
FIG. 6 shows another method for driving the display device in each of the examples of the present invention.

In each of the above-described examples, each of the electrochromic layers (EC, EC1, EC2, EC3) is driven as a whole. Alternatively, as shown in, for example, FIG. 6, each of the electrochromic layers (EC, EC1, EC2, EC3) may be driven in a divided manner. FIG. 6 shows such another method for driving the display device in each of the examples.

Referring to FIG. 6, each of the electrochromic layers (EC, EC1, EC2, EC3) is divided into a plurality of areas (six areas in FIG. 6), and the EC driving circuit (CIREC) drives the divided areas in a time division manner or independently.

According to the driving method shown in FIG. 6, the capacitance of each of the electrochromic layers (EC, EC1, EC2, EC3), which is a load capacitance of the EC driving circuit (CIREC), can be decreased. Thus, higher-speed driving is realized.

In each of the above-described examples, in a bright site, the organic EL display panel (PNL) may stop emitting light and use the reflective layer 102 so that the organic EL display panel (PNL) acts as a reflection type device. In this case, low power consumption driving is realized.

Figure 7:
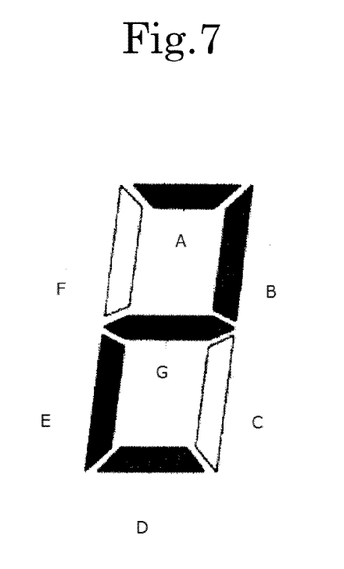
FIG. 7 shows a segment type display device driven in a static manner.

The present invention is applicable to a display device including pixels arranged in a matrix and driven in a dynamic manner, and also is applicable to a segment type display device driven in a static manner as shown in FIG. 7.

In the case where the present invention is applied to the segment type display device driven in the static manner as shown in FIG. 7, seven segments A through G each include an OLED for displaying a white image and an electrochromic layer (EC, EC1 through EC3).

So far, the invention made by the present inventors has been described by way of the examples. The present invention is not limited to these examples and may be modified in various manners without departing from the gist thereof, needless to say. In the examples, the display devices include an OLED. Alternatively, a liquid crystal element for displaying a white image may be used in a display device according to the present invention instead of the OLED. In this case also, substantially the same effects are provided, needless to say.

What is claimed is:
1. A display device, comprising:
a display panel comprising a white light emitting layer;
an electrochromic layer stacked on the display panel; and
a voltage application unit for applying a driving voltage to the electrochromic layer;
wherein:
the display panel displays a white image by emitting light of the white light emitting layer;
the electrochromic layer allows a spectrum of the light to be transmitted therethrough to be controlled in accordance with the driving voltage applied thereto;
the voltage application unit controls the driving voltage to be applied to the electrochromic layer in synchronization with display of the white image on the display panel, thus to control the spectrum of the light to be transmitted through the electrochromic layer,
the white image displayed on the display panel is a first predetermined white image for a first color, a second predetermined white image for a second color or a third predetermined white image for a third color;
in a case where the white image displayed on the display panel is the first predetermined white image for the first color, the voltage application unit controls the driving voltage to be applied to the electrochromic layer such that the light transmitted through the electrochromic layer is of the first color;
in a case where the white image displayed on the display panel is the second predetermined white image for the second color, the voltage application unit controls the driving voltage to be applied to the electrochromic layer such that the light transmitted through the electrochromic layer is of the second color; and in a case where the white image displayed on the display panel is the third predetermined white image for the third color, the voltage application unit controls the driving voltage to be applied to the electrochromic layer such that the light transmitted through the electrochromic layer is of the third color.

2. A display device according to claim 1, wherein:
the voltage application unit comprises:
  an EC upper electrode, and
  an EC lower electrode;
the electrochromic layer is held between the EC upper electrode and the EC lower electrode; and
the display panel comprises:
  an upper electrode,
  a lower electrode, and
  the white light emitting layer held between the upper electrode and the lower electrode.

3. A display device according to claim 2, wherein the upper electrode also acts as the EC lower electrode.

4. A display device according to claim 1, wherein:
the electrochromic layer is divided into a plurality of areas; and
the voltage application unit controls the light to be transmitted through each of the areas of the electrochromic layer.

5. A display device according to claim 1, wherein the display panel is an organic EL display panel.

6. A display device, comprising:
a display panel comprising a white light emitting layer;
a first electrochromic layer and a second electrochromic layer stacked on the display panel; and
a voltage application unit for applying driving voltages to the first electrochromic layer and the second electrochromic layer;
wherein:
the display panel displays a white image by emitting light of the white light emitting layer;
the first electrochromic layer and the second electrochromic layer allow a spectrum of the light to be transmitted therethrough to be controlled in accordance with the driving voltages applied thereto; and
the voltage application unit controls the driving voltages to be applied to the first electrochromic layer and the second electrochromic layer in synchronization with display of the white image on the display panel, thus to control the spectrum of the light to be transmitted through the first electrochromic layer and the second electrochromic layer.

7. A display device according to claim 6, wherein:
the white image displayed on the display panel is a first predetermined white image for a first color, a second predetermined white image for a second color or a third predetermined white image for a third color;
in a case where the white image displayed on the display panel is the first predetermined white image for the first color, the voltage application unit controls the driving voltages to be applied to the first electrochromic layer and the second electrochromic layer such that the light transmitted through the first electrochromic layer and the second electrochromic layer is of the first color;
in a case where the white image displayed on the display panel is the second predetermined white image for the second color, the voltage application unit controls the driving voltages to be applied to the first electrochromic layer and the second electrochromic layer such that the light transmitted through the first electrochromic layer and the second electrochromic layer is of the second color; and in a case where the white image displayed on the display panel is the third predetermined white image for the third color, the voltage application unit controls the driving voltages to be applied to the first electrochromic layer and the second electrochromic layer such that the light transmitted through the first electrochromic layer and the second electrochromic layer is of the third color.

8. A display device according to claim 6, wherein:
the voltage application unit comprises:
  a first EC upper electrode,
  a second EC upper electrode,
  a first EC lower electrode, and
  a second EC lower electrode;
the first electrochromic layer is held between the first EC upper electrode and the first EC lower electrode;
the second electrochromic layer is held between the second EC upper electrode and the second EC lower electrode; and
the display panel comprises:
  an upper electrode;
  a lower electrode; and
  the white light emitting layer held between the upper electrode and the lower electrode.

9. A display device according to claim 8, wherein:
the second EC upper electrode also acts as the first EC lower electrode; and
the upper electrode also acts as the second EC lower electrode.

10. A display device according to claim 6, wherein:
the first electrochromic layer and the second electrochromic are each divided into a plurality of areas; and
the voltage application unit controls the light to be transmitted through each of the areas of the first electrochromic layer and the second electrochromic layer.

11. A display device according to claim 6, wherein the display panel is an organic EL display panel.

12. A display device, comprising:
a display panel comprising a white light emitting layer;
a first electrochromic layer, a second electrochromic layer and a third electrochromic layer stacked on the display panel; and
a voltage application unit for applying driving voltages to the first electrochromic layer, the second electrochromic layer and the third electrochromic layer;
wherein:
the display panel displays a white image by emitting light of the white light emitting layer;
the first electrochromic layer, the second electrochromic layer and the third electrochromic layer allow a spectrum of the light to be transmitted therethrough to be controlled in accordance with the driving voltages applied thereto; and
the voltage application unit controls the driving voltages to be applied to the first electrochromic layer, the second electrochromic layer and the third electrochromic layer in synchronization with display of the white image on the display panel, thus to control the spectrum of the light to be transmitted through the first electrochromic layer, the second electrochromic layer and the third electrochromic layer.

13. A display device according to claim 12, wherein:
the white image displayed on the display panel is a first predetermined white image for a first color, a second predetermined white image for a second color or a third predetermined white image for a third color;

in a case where the white image displayed on the display panel is the first predetermined white image for the first color, the voltage application unit controls the driving voltages to be applied to the first electrochromic layer, the second electrochromic layer and the third electrochromic layer such that the light transmitted through the first electrochromic layer, the second electrochromic layer and the third electrochromic layer is of the first color;

in a case where the white image displayed on the display panel is the second predetermined white image for the second color, the voltage application unit controls the driving voltages to be applied to the first electrochromic layer, the second electrochromic layer and the third electrochromic layer such that the light transmitted through the first electrochromic layer, the second electrochromic layer and the third electrochromic layer is of the second color; and in a case where the white image displayed on the display panel is the third predetermined white image for the third color, the voltage application unit controls the driving voltages to be applied to the first electrochromic layer, the second electrochromic layer and the third electrochromic layer such that the light transmitted through the first electrochromic layer, the second electrochromic layer and the third electrochromic layer is of the third color.

14. A display device according to claim 12, wherein:
the voltage application unit comprises:
a first EC upper electrode,
a second EC upper electrode,
a third EC upper electrode,
a first EC lower electrode,
a second EC lower electrode, and
a third EC lower electrode;
the first electrochromic layer is held between the first EC upper electrode and the first EC lower electrode;
the second electrochromic layer is held between the second EC upper electrode and the second EC lower electrode;
the third electrochromic layer is held between the third EC upper electrode and the third EC lower electrode; and
the display panel comprises:
an upper electrode;
a lower electrode; and
the white light emitting layer held between the upper electrode and the lower electrode.

15. A display device according to claim 14, wherein:
the second EC upper electrode also acts as the first EC lower electrode;
the third EC upper electrode also acts as the second EC lower electrode; and
the upper electrode also acts as the third EC lower electrode.

16. A display device according to claim 12, wherein:
the first electrochromic layer, the second electrochromic and the third electrochromic layer are each divided into a plurality of areas; and
the voltage application unit controls the light to be transmitted through each of the areas of the first electrochromic layer, the second electrochromic layer and the third electrochromic layer.

17. A display device according to claim 12, wherein the display panel is an organic EL display panel.

* * * * *